United States Patent
Huang et al.

(10) Patent No.: US 11,664,876 B2
(45) Date of Patent: May 30, 2023

(54) METHOD AND DEVICE FOR TRAINING DOWNLINK BEAMS

(71) Applicant: CHINA ACADEMY OF TELECOMMUNICATIONS TECHNOLOGY, Beijing (CN)

(72) Inventors: Qiuping Huang, Beijing (CN); Qiubin Gao, Beijing (CN); Runhua Chen, Beijing (CN); Hui Li, Beijing (CN); Rakesh Tamrakar, Beijing (CN); Yang Song, Beijing (CN); Xin Su, Beijing (CN); Yu Yang, Beijing (CN); Mengjun Wang, Beijing (CN); Chuanjun Li, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 636 days.

(21) Appl. No.: 16/324,880

(22) PCT Filed: Aug. 3, 2017

(86) PCT No.: PCT/CN2017/095838
§ 371 (c)(1),
(2) Date: Feb. 11, 2019

(87) PCT Pub. No.: WO2018/028501
PCT Pub. Date: Feb. 15, 2018

(65) Prior Publication Data
US 2021/0344407 A1 Nov. 4, 2021

(30) Foreign Application Priority Data
Aug. 12, 2016 (CN) .......................... 201610665954.3

(51) Int. Cl.
H04B 7/08 (2006.01)
H04B 7/0408 (2017.01)
H04B 7/06 (2006.01)

(52) U.S. Cl.
CPC ......... H04B 7/0851 (2013.01); H04B 7/0408 (2013.01); H04B 7/0695 (2013.01); H04B 7/088 (2013.01)

(58) Field of Classification Search
CPC .. H04B 7/0851; H04B 7/0408; H04B 7/0695; H04B 7/088
See application file for complete search history.

(56) References Cited

U.S. PATENT DOCUMENTS 8,116,694 B2 2/2012 Kaaja et al.
2009/0061784 A1 3/2009 Cordeiro
(Continued)

FOREIGN PATENT DOCUMENTS

CN 102177742 A 9/2011
CN 102326338 A 1/2012
(Continued)

OTHER PUBLICATIONS

International Search Report for PCT/CN2017/095838 dated Oct. 19, 2017 and its English translation provided by WIPO.
(Continued)

*Primary Examiner* — Sophia Vlahos
(74) *Attorney, Agent, or Firm* — Ladas & Parry, LLP (57) ABSTRACT

A method and a device for transmitting downlink reception beam training signals are provided. The method at the second device side includes: receiving a downlink reception beam training trigger notification message sent by a first device; receiving downlink reception beam training signals sent by the first device, based on the downlink reception beam training trigger notification message; and performing
(Continued)

a downlink reception beam training based on the downlink reception beam training signals. The method at the first device side includes: sending a downlink reception beam training trigger notification message to a second device when determining that a downlink reception beam training is to be performed for the second device, and sending downlink reception beam training signals to the second device after the downlink reception beam training trigger notification message is sent to the second device.

12 Claims, 4 Drawing Sheets

(56) References Cited

U.S. PATENT DOCUMENTS

| | | |
|---|---|---|
| 2010/0103045 A1 | 4/2010 | Liu et al. |
| 2010/0214169 A1 | 8/2010 | Kafle |
| 2012/0122392 A1 | 5/2012 | Morioka et al. |
| 2013/0039345 A1 | 2/2013 | Kim et al. |
| 2013/0072243 A1 | 3/2013 | Yu et al. |
| 2013/0089000 A1* | 4/2013 | Hansen ........... H04B 7/0617 370/254 |
| 2013/0315325 A1 | 11/2013 | Wang et al. |
| 2014/0044044 A1 | 2/2014 | Josiam et al. |
| 2014/0307654 A1 | 10/2014 | Kim |
| 2015/0249929 A1 | 9/2015 | Irie et al. |
| 2015/0351135 A1 | 12/2015 | Schmidt et al. |
| 2016/0044711 A1 | 2/2016 | Lou et al. |
| 2016/0190686 A1 | 6/2016 | Gao et al. |
| 2017/0156067 A1* | 6/2017 | Huang ............. H04B 7/0608 |
| 2017/0302495 A1* | 10/2017 | Islam ............. H04W 72/042 |
| 2017/0303263 A1* | 10/2017 | Islam ............. H04B 7/0639 |
| 2018/0006689 A1* | 1/2018 | Da Silva ......... H04B 7/0617 |
| 2018/0302131 A1* | 10/2018 | Zhao ............... H04B 7/0897 |

FOREIGN PATENT DOCUMENTS

| | | |
|---|---|---|
| CN | 102326339 A | 1/2012 |
| CN | 103718591 A | 4/2014 |
| CN | 103931109 A | 7/2014 |
| CN | 104734759 A | 6/2015 |
| CN | 105340132 A | 2/2016 |
| CN | 105721033 A | 6/2016 |
| CN | 106953676 A | 7/2017 |
| JP | 2014526837 A | 10/2014 |
| JP | 2015164271 A | 9/2015 |
| JP | 2015532039 A | 11/2015 |
| KR | 20130017932 A | 2/2013 |

OTHER PUBLICATIONS

Written Opinion of the International Searching Authority for PCT/CN2017/095838 dated Oct. 19, 2017 and its English translation provided by WIPO.
International Preliminary Report on Patentability from PCT/CN2017/095838, dated Feb. 12, 2019, with English translation from WIPO.
Extended European Search Report from EP app. No. 17838631.4, dated May 31, 2019.
First Office Action and Search Report from CN app. No. 201610665954.3, dated May 28, 2019, with English translation from Global Dossier.
Notice of Reasons for Refusal from JP app. No. 2019-505526, dated Jan. 8, 2020, with English translation from Global Dossier.
"Considerations on Beam Management for NR", R1-166583, 3GPP TSG RAN WG1 Meeting #86, Gothenburg, Sweden, Aug. 22-26, 2016.
Fourth Office Action and supplementary search report from CN app. No. 201610665954.3, dated Jan. 21, 2021, with English translation from Global Dossier.
Notification of Reason for Refusal from KR app. No. 10-2019-7007105, dated Feb. 27, 2020, with English translation from KIPO.
Appeal decision from corresponding IP app. No. 2019-505526, dated Oct. 5, 2021, with English translation from Global Dossier, all pages.

* cited by examiner

METHOD AND DEVICE FOR TRAINING DOWNLINK BEAMS

CROSS REFERENCE TO RELATED APPLICATIONS

The present application is the U.S. national phase of PCT Application PCT/CN2017/095838 filed on Aug. 3, 2017, which claims priority to Chinese patent application No. 201610665954.3 filed on Aug. 12, 2016, the disclosures of which are incorporated herein by reference in their entireties.

TECHNICAL FIELD

The present disclosure relates to the field of communication technology, and in particular to a method and a device for training downlink beams.

BACKGROUND

In view of the important role of MIMO (Multiple Input Multiple Output) technology for improving peak rate and system spectrum utilization, wireless access technology standards such as LTE (Long Term Evolution)/ILTE-A (LTE-Advanced) are all built on the basis of MIMO+OFDM (Orthogonal Frequency Division Multiplexing) technology.

The performance gain of MIMO technology comes from the spatial freedom that multi-antenna systems can obtain. Therefore, one of the most important evolution directions of MIMO technology in the development of standardization is the extension of dimensions.

In LTE Rel-8, up to 4 layers of MIMO transmission can be supported.

Rel-9 focuses on MU-MIMO technology enhancement, and TM (Transmission Mode)-8 MU-MIMO (Multi-User MIMO, multi-user multiple input multiple output) transmission can support up to 4 downlink data layers.

Rel-10 supports 8 antenna ports, thereby further improving the spatial resolution of channel state information, and further extending the transmission capability of SU-MIMO (Single-User MIMO, single-user multiple input multiple output) to up to 8 data layers.

Rel-13 and Rel-14 introduce FD-MIMO technology to support 32 ports, thereby beamforming in both full dimension and vertical directions.

Beamforming is a signal preprocessing technique based on an antenna array. Beamforming produces a directional beam by adjusting the weighting coefficients of each element in the antenna array, so that a significant array gain can be obtained. Therefore, the beamforming technology has great advantages in terms of expanding coverage, thereby improving edge throughput, and suppressing interference.

In order to further improve MIMO technology, a large-scale antenna technology is introduced in mobile communication systems. For base stations, full digital large-scale antennas can have up to 128/256/512 antenna elements and up to 128/256/512 transceivers, where each is connected to a transceiver.

The antenna vibrator is a component on the antenna that has the function of guiding and amplifying electromagnetic waves, so that the electromagnetic signal received by the antenna is stronger. The antenna vibrator is made of a metal having good conductivity. The vibrator has a rod shape, and some of the structures are more complicated. Generally, a plurality of vibrators is arranged in parallel on the antenna.

The terminal measures channel state information and feeds back the same by transmitting pilot signals of up to 128/256/512 antenna ports.

For the terminal, an antenna array of up to 32/64 antenna vibrator can also be configured.

Through the beamforming on both the base station and the terminal sides, a huge beamforming gain is obtained to compensate for the signal attenuation caused by the path loss. Especially in high-band communications, such as the 30 GHz frequency, the path loss makes the coverage of wireless signals extremely limited. By large-scale antenna technology, the coverage of wireless signals can be extended to an applicable range.

The full-digital antenna arrays, each with an independent transceiver, will greatly increase the size, cost and power consumption of the device. Especially for the analog-to-digital converter (ADC) and digital-to-analog converter (DAC) of the transceiver, the power consumption has only been reduced by about 1/10 in the past decade, and the performance improvement is limited.

Figure 1:
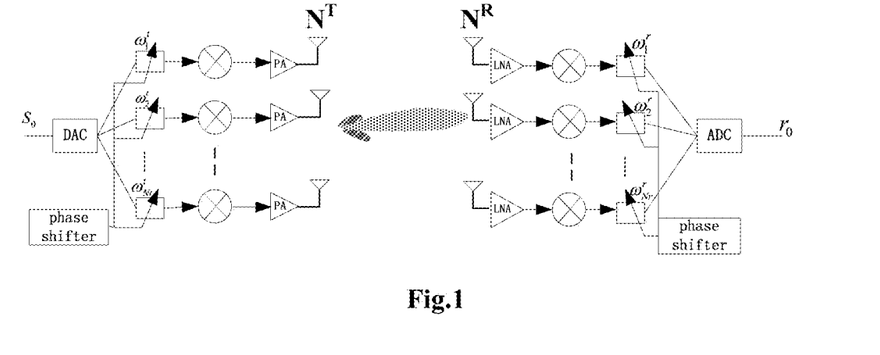
FIG. 1 is a schematic view of a weighted shaping of an intermediate frequency (baseband) signal performed by an analog beamforming.
Figure 2:
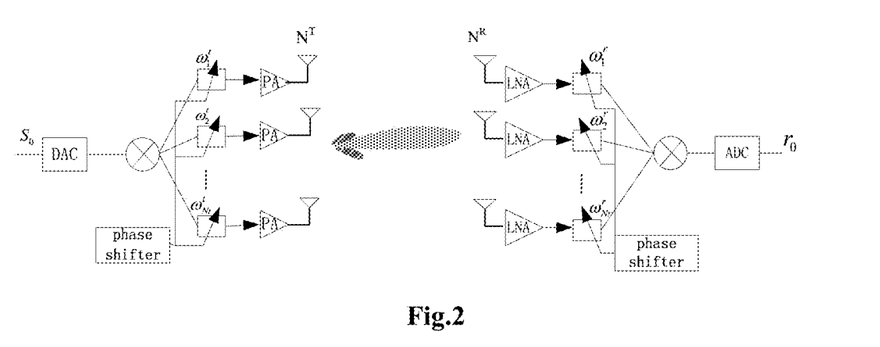
FIG. 2 is a schematic view of a weighted shaping of a radio frequency signal performed by analog beamforming.

In order to reduce the size, cost and power consumption of the device, a technical solution based on analog beamforming is proposed, as shown in FIGS. 1 and 2. The main characteristic of analog beamforming is the weighted beamforming of the intermediate frequency (FIG. 1) or the RF signal (FIG. 2) by a phase shifter.

The S0 signal (a baseband signal, i.e., the intermediate frequency signal) passes through a digital-to-analog converter (DAC), then is weighted and shaped by a phase shifter, and is amplified by a power amplifier (PA) for transmission.

After receiving the signal by the receiving antenna, the signal is amplified by a low noise amplifier (LNA), and then subjected to weighted shaping through a phase shifter, and then sent to an analog-to-digital converter (ADC) to output a receiving signal r0;

The advantage is that all transmit (receive) antennas have only one transceiver, so it simple to implement, thereby reducing the cost, the size and the power consumption.

Figure 3:
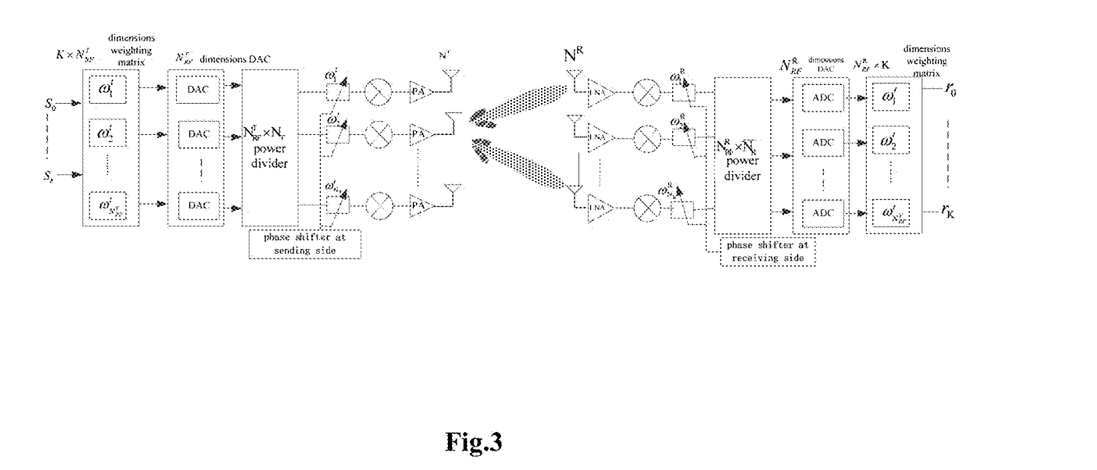
FIG. 3 is a schematic view of a digital-to-analog hybrid beamforming.

In order to further improve the analog beamforming performance, a digital analog hybrid beamforming transceiver architecture scheme is proposed, as shown in FIG. 3.

In FIG. 3, there are $N_{RF}^T$ and $N_{RF}^R$ transceivers (antennas) at the transmitting end and the receiving end, and the quantity of antenna vibrator at the transmitting end is $N^T > N_{RF}^T$, and the number of antenna elements at the receiving end is $N^R > N_{RF}^R$ Maximum parallelism transport streams supported by beamforming is $\min(N_{RF}^T, N_{RF}^T)$.

The hybrid beamforming structure of FIG. 3 balances the flexibility of digital beamforming and the low complexity of analog beamforming, which has the ability to support multiple data streams and simultaneous shaping of multiple users, while the complexity is within reasonable limits.

Both the analog beamforming and digital-to-analog hybrid beamforming require an adjustment of the analog beamforming weights at both the sending and receiving ends, so that the resultant beam may be aligned with the opposite end of the communication.

For the downlink transmission, the beamforming weights sent by the base station side and the beamforming weights received by the terminal side need to be adjusted. For the uplink transmission, the beamforming weights sent by the terminal side and received by the base station side need to be adjusted.

In the communication system in the related art, there is not an effective beam training method.

SUMMARY

The technical problem to be solved by the present disclosure is to provide a method and a device for training downlink beams, so that the terminal may perform a downlink reception beam training based on a trigger performed by the base station.

To solve the above technical problem, an embodiment of the present disclosure, a method for training downlink beams is provided in some embodiments of the present disclosure, including:

receiving a downlink reception beam training trigger notification message sent by a first device;

receiving downlink reception beam training signals sent by the first device, based on the downlink reception beam training trigger notification message; and performing a downlink reception beam training based on the downlink reception beam training signals.

Optionally, prior to the receiving the downlink reception beam training trigger notification message sent by the first device, the method further includes: sending a downlink reception beam training request message to the first device.

Optionally, prior to the receiving the downlink reception beam training signals sent by the first device based on the downlink reception beam training trigger notification message, the method further includes:

sending, to the first device, a quantity of downlink reception beams of a second device or a quantity of downlink reception beams needed to be trained of the second device.

Optionally, the receiving the downlink reception beam training trigger notification message sent by the first device to a second device further includes:

receiving the downlink reception beam training trigger notification message sent by the first device, through downlink control information DCI or a dedicated trigger signaling.

Optionally, the downlink reception beam training trigger notification message includes: indication information of whether there exists the downlink reception beam training signals and/or time frequency positions of the downlink reception beam training signals.

Optionally, the receiving the downlink reception beam training signals sent by the first device based on the downlink reception beam training trigger notification message further includes:

receiving the downlink reception beam training signals sent by the first device through downlink transmission beams determined by the first device, based on the downlink reception beam training trigger notification message.

Optionally, prior to the receiving the downlink reception beam training signals sent by the first device through downlink transmission beams determined by the first device based on the downlink reception beam training trigger notification message, the method further includes:

reporting, to the first device, result information about a training of the downlink transmission beams of the first device.

Optionally, the result information includes: recommended identifiers of the downlink transmission beams of the first device by a second device and/or strength information of the downlink transmission beam training signals of the first device measured by a second device.

Optionally, the receiving the downlink reception beam training signals sent by the first device, based on the downlink reception beam training trigger notification message further includes:

receiving the downlink reception beam training signals sent by the first device, based on the downlink reception beam training trigger notification message and time domain positions of the downlink reception beam training signals in a subframe.

Optionally, the time domain positions of the downlink reception beam training signals in the subframe are appointed by a second device and the first device or determined by the first device. The performing the downlink reception beam training based on the downlink reception beam training signals further includes:

performing the downlink reception beam training based on the downlink reception beam training signals in the case that the beam receiving beam training trigger notification message applies, and determining a downlink reception beam that receives downlink data sent by the first device.

Optionally, an effective time point of the downlink reception beam training trigger notification message is a time point of receiving the downlink reception beam training trigger notification message plus a time interval, where the time interval is appointed by a second device and the first device or determined by the first device.

Optionally, the determining the downlink reception beam that receives the downlink data sent by the first device further includes:

receiving the downlink reception beam training signals through different downlink reception beams, and selecting the downlink reception beam with a strongest receiving signal power as the downlink reception beam that receives the downlink data sent by the first device; or receiving the downlink reception beam training signals through different downlink reception beams, performing a channel estimation, and selecting, based on a result of the channel estimation, the downlink reception beam with a strongest receiving signal power as the downlink reception beam that receives the downlink data sent by the first device; or performing the downlink reception beam training through a wide downlink reception beam, then performing the downlink reception beam training through a narrow downlink reception beam, and determining an optimal narrow downlink reception beam as the downlink reception beam that receives the downlink data sent by the first device.

Optionally, subsequent to the determining the downlink reception beam that receives the downlink data sent by the first device, the method further includes:

receiving the downlink data sent by the first device through the determined downlink reception beam.

A device for training downlink beams is further provided in some embodiments of the present disclosure, including:

a receiving module, configured to receive a downlink reception beam training trigger notification message sent by a first device; and a training module, configured to receive downlink reception beam training signals sent by the first device, based on the downlink reception beam training trigger notification message, and perform a downlink reception beam training based on the downlink reception beam training signals.

Optionally, the device further includes: a first sending module, configured to send a downlink reception beam training request message to the first device.

Optionally, the device further includes: a second sending module, configured to send, to the first device, a quantity of downlink reception beams of a second device or a quantity of downlink reception beams needed to be trained of the second device.

A method for training downlink beams is further provided in some embodiments of the present disclosure, including:

sending a downlink reception beam training trigger notification message to a second device;

sending downlink reception beam training signals to the second device, where the downlink reception beam training trigger notification message is configured to trigger the second device to receive the downlink reception beam training signals to perform a downlink reception beam training.

Optionally, prior to the sending the downlink reception beam training trigger notification message to the second device, the method further includes:

receiving a downlink reception beam training request message sent by the second device.

Optionally, prior to the sending the downlink reception beam training signals to the second device, the method further includes:

receiving a quantity of downlink reception beams sent by the second device or a quantity of downlink reception beams needed to be trained sent by the second device.

Optionally, the sending the downlink reception beam training trigger notification message to the second device further includes:

sending the downlink reception beam training trigger notification message to the second device, through downlink control information DCI or a dedicated signaling.

Optionally, the downlink reception beam training trigger notification message includes: indication information of whether there exists the downlink reception beam training signals and/or time frequency positions of the downlink reception beam training signals.

Optionally, the sending the downlink reception beam training signals to the second device further includes:

determining a downlink transmission beam used by the downlink reception beam training signals;

beamforming the downlink reception beam training signals based on beamforming weights of the downlink transmission beams, and sending the downlink reception beam training signals to the second device.

Optionally, the determining the downlink transmission beam used by the downlink reception beam training signals further includes:

receiving result information about a training of the downlink transmission beams of the first device reported by the second device;

determining, based on the result information, the downlink transmission beam used by sending the downlink reception beam training signals.

Optionally, the result information includes: recommended identifiers of the downlink transmission beams of the first device by the second device or strength information of the downlink transmission beam training signals of the first device measured by the second device.

Optionally, the downlink transmission beam used by the downlink reception beam training signals are the same with the downlink transmission beams through which the first device sends downlink data to the second device.

Optionally, time domain positions of the downlink reception beam training signals sent to the second device in the subframe are appointed by the second device and a first device or determined by the first device.

Optionally, in the case that the time domain positions of the downlink reception beam training signals sent to the second device in the subframe are determined by the first device, the first device sends a notification message of the time domain positions to the second device.

Optionally, a time point of sending the downlink reception beam training signals to the second device is a time point of sending the downlink reception beam training trigger notification message plus a time interval, where the time interval is appointed by a second device and the first device or determined by the first device.

Optionally, in the case that the time interval is determined by the first device, the first device sends a notification message of the time interval to the second device.

A device for training downlink beams is further provided in some embodiments of the present disclosure, including:

a first sending module, configured to send a downlink reception beam training trigger notification message to a second device; and a second sending module, configured to send downlink reception beam training signals to the second device, where the downlink reception beam training trigger notification message is configured to trigger the second device to receive the downlink reception beam training signals to perform a downlink reception beam training.

Optionally, the device further includes: a first receiving module, configured to receive a downlink reception beam training request message sent by the second device.

Optionally, the device further includes: a second receiving module, configured to receive a quantity of downlink reception beams sent by the second device or a quantity of downlink reception beams needed to be trained sent by the second device.

A device for training downlink beams is further provided in some embodiments of the present disclosure, including a receiver, a processor and a memory, where the receiver is configured to receive a downlink reception beam training trigger notification message sent by a first device;

the processor is configured to execute a program and data stored in the memory to: trigger the receiver to receive downlink reception beam training signals sent by the first device, based on the downlink reception beam training trigger notification message, and perform a downlink reception beam training based on the downlink reception beam training signals received by the receiver.

Optionally, the device further includes a transmitter, where the transmitter is configured to send a downlink reception beam training request message to the first device.

A device for training downlink beams is further provided in some embodiments of the present disclosure, including a transmitter, a processor and a memory, where the processor is configured to execute a program and data stored in the memory to generate a downlink reception beam training trigger notification message and downlink reception beam training signals;

the transmitter is configured to send the downlink reception beam training trigger notification message to a second device and send the downlink reception beam training signals to the second device, where the downlink reception beam training trigger notification message is configured to trigger the second device to receive the downlink reception beam training signals to perform a downlink reception beam training.

Optionally, the device further includes a receiver, where the receiver is configured to receive a downlink reception beam training request message sent by the second device.

The beneficial effects of the above technical solution of the present disclosure are as follows:

According to the embodiments of the present disclosure, a downlink reception beam training trigger notification message sent by a first device is received, downlink reception beam training signals sent by the first device is received based on the downlink reception beam training trigger notification message, and then a downlink reception beam training is performed. The first device may be a base station, and the second device may be a terminal, so that the terminal performs a downlink beam training based on a base station-based trigger mechanism

DETAILED DESCRIPTION

To make the technical issues, the technical solutions, and the advantages of the present disclosure more clearly, the present disclosure will be described in conjunction with drawings and embodiments.

In the embodiments of the present disclosure, the first device may be a base station or other type of transmission point device and the second device may be a user equipment (or terminal). Of course, it is not limited to the above two types of devices. For example, the sending device (e.g., a first device) may also be a terminal that can perform configuration operations on other terminals.

The base station may be an evolved base station (Evolutional Node B, referred to as an eNB or an e-NodeB), a macro base station, a micro base station (also referred to as a "small base station"), a pico base station, and an access point (AP) or Transmit or Receive Point (TRP) and the like in an LTE system or an evolved system thereof. The base station may also be a base station in a future network, such as a base station in a 5G network.

The terminal may also be referred to as a user equipment (UE), or may be called a Terminal, a mobile station (Mobile Station, Miss.), a mobile terminal (Mobile Terminal), etc., and the terminal may communicate with one or more core networks through the Radio Access Network (RAN). For example, the terminal may be a mobile phone (or "cellular" phone), a computer with a mobile terminal, etc., for example, the terminal may also be portable, pocket, hand-held, computer built-in or in-vehicle mobile devices that exchange voice and/or data with a radio access network.

It should be noted that, in some embodiments of the present disclosure, the downlink data is not limited to the downlink data carried in the channels such as PDSCH of the communication system, which may be all possible downlink signals sent by the base station, including the downlink data signal or the downlink control signal.

The terminal in the embodiments of the present disclosure may also be a D2D (Device to Device) terminal or an M2M (Machine to Machine) terminal.

For convenience of description, in the following embodiments, a base station serves as a first device and a terminal serves as a second device.

First Embodiment

Figure 4:
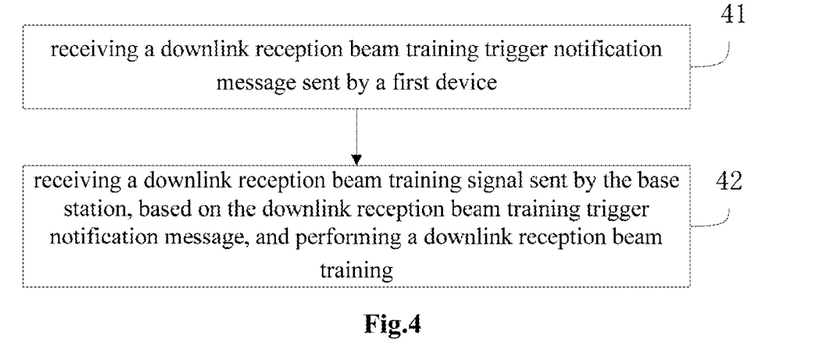
FIG. 4 is a flowchart of a method for training downlink beams at a terminal side in some embodiments of the present disclosure.

As shown in FIG. 4, a method for training downlink beams is provided in some embodiments of the present disclosure, including:

Step 41: receiving a downlink reception beam training trigger notification message sent by a first device.

Specifically, the downlink reception beam training trigger notification message sent by the base station may be received through downlink control information DCI or a dedicated trigger signaling or other information blocks. The DCI may be an uplink access permission DCI or a downlink access permission DCI.

In addition, the downlink reception beam trigger notification message includes but not limited to the following contents:

A) indication information of whether there exists the downlink reception beam training signals; and/or B) time frequency positions of the downlink reception beam training signals, for example, the occupied OFDM symbols, the start time, etc.;

Step 42: receiving downlink reception beam training signals sent by the base station, based on the downlink reception beam training trigger notification message, and performing a downlink reception beam training.

Specifically, it is able to receive the downlink reception beam training signals sent by the base station through downlink transmission beams determined by the base station, based on the downlink reception beam training trigger notification message. In addition, the downlink reception beam training signals is shaped through beamforming weights of the downlink transmission beams and the resultant downlink reception beam training signal is sent.

The downlink transmission beam of the base station may be determined in the following manner: the base station determines the downlink transmission beam, based on the result information of the downlink transmission beam training of the base station reported by the terminal to the base station, where the result information may include: recommended identifiers of the downlink transmission beams of the base station by the terminal and/or strength information of the downlink transmission beam training signals of the base station measured by the terminal.

For example, the base station determines that the downlink transmission beam is all or part of the downlink transmission beam recommended by the terminal and reported by the terminal.

For another example, the base station determines one or more beams facing the terminal based on the result information of downlink transmission beam training reported by the terminal.

The downlink transmission beam includes an angular coverage range of the downlink transmission beam recommended by the terminal, or smaller than the angular coverage range of the downlink transmission beam recommended by the terminal, and the like.

The result information about the training of the downlink transmission beams of the base station that is reported by the terminal may include a serial number of the recommended downlink transmission beam, such as a number of the downlink transmission beam, and may further include downlink transmission beam training signal strength information received by the terminal, for example, a power level of the receive signal, etc.

The step of performing the downlink reception beam training may further include: performing, by a second device, an AGC (Automatic Gain Control) adjustment by using the trained downlink reception beam.

According to the embodiments of the present disclosure, a downlink reception beam training trigger notification message sent by a base station is received, downlink reception beam training signals sent by the base station is received based on the downlink reception beam training trigger notification message, and then a downlink reception beam training is performed, so that the terminal performs a downlink beam training based on a base station-based trigger mechanism.

Second Embodiment

Figure 5:
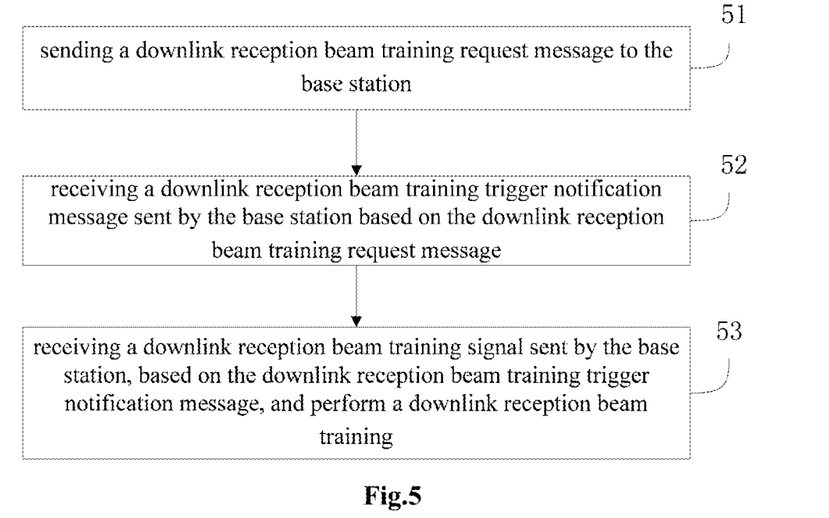
FIG. 5 is a flowchart of a method for training downlink beams at a terminal side in some embodiments of the present disclosure.

As shown in FIG. 5, a method for training downlink beams is further provided in some embodiments of the present disclosure, including:

Step 51: sending a downlink reception beam training request message to the base station, where the terminal may also send to the base station a quantity of downlink reception beams of the terminal or a quantity of downlink reception beams that needed to be trained, and the base station determines, based on the quantity of the downlink reception beams or the quantity of downlink reception beams to be trained, the quantity of downlink reception beam training signals. Here, the terminal may send to the base station both the downlink reception beam training request message and the quantity of downlink reception beams of the terminal or the quantity of the downlink reception beams to be trained, or only the downlink reception beam training request message is sent to the base station, or only the quantity of downlink reception beams of the terminal or the quantity of downlink reception beams to be trained is sent to the base station.

Step 52: receiving a downlink reception beam training trigger notification message sent by the base station based on the downlink reception beam training request message.

Specifically, the downlink reception beam training trigger notification message sent by the base station to the terminal may be received through the downlink control information (DCI) or dedicated trigger signaling or other information blocks, where the DCI may be an uplink access permission DCI or a downlink access permission DCI.

In addition, the downlink reception beam trigger notification message includes but not limited to the following contents:

A) indication information of whether there exists the downlink reception beam training signals; and/or B) time frequency positions of the downlink reception beam training signals, for example, the occupied OFDM symbol, the start time, etc.

Step 53: receiving downlink reception beam training signals sent by the base station, based on the downlink reception beam training trigger notification message, and perform a downlink reception beam training.

The step of performing the downlink reception beam training may further include: performing, by the second device, an AGC (Automatic Gain Control) adjustment by using the trained downlink reception beam.

Specifically, it is able to receive the downlink reception beam training signals sent by the base station through downlink transmission beams determined by the base station, based on the downlink reception beam training trigger notification message. In addition, the downlink reception beam training signals is shaped through beamforming weights of the downlink transmission beams and the resultant downlink reception beam training signal is sent.

The downlink transmission beam of the base station may be determined in the following manner: the base station determines the downlink transmission beam, based on the result information of the downlink transmission beam training of the base station reported by the terminal to the base station, where the result information may include: recommended identifiers of the downlink transmission beams of the base station by the terminal and/or strength information of the downlink transmission beam training signals of the base station measured by the terminal.

For example, the base station determines that the downlink transmission beams are all or a part of the downlink transmission beams recommended by the terminal and reported by the terminal.

For another example, the base station determines one or more beams facing the terminal or a group of terminals based on result information about a training of the downlink transmission beams reported by one or mom terminals.

The downlink transmission beam includes an angular coverage range of the downlink transmission beam recommended by the terminal, or smaller than the angular coverage range of the downlink transmission beam recommended by the terminal, and the like.

The result information about the training of the downlink transmission beams of the base station that is reported by the terminal may include a serial number of the recommended downlink transmission beam, such as a number of the downlink transmission beam, and may further include downlink transmission beam training signal strength information received by the terminal, for example, a power level of the receive signal, etc.

In some embodiments of the present disclosure, the terminal may receive the downlink reception beam training signals sent by the base station based on the downlink reception beam training trigger notification message and time domain positions of the downlink reception beam training signals in the subframe.

The subframe here may be a subframe in the LTE system, or may be a frame or other time units in the LTE system, or may be a time unit in other systems, which is not limited herein.

The time domain positions of the downlink reception beam training signals in the subframe here may be appointed by the terminal and the base station or determined by the base station.

In some embodiments of the present disclosure, in an OFDM-based system, the downlink reception beam training signals may be transmitted in the first M OFDM symbols of each subframe. The value of M may be appointed by the terminal and the base station or determined by the base station.

When the time domain positions of the downlink reception beam training signals in the subframe are determined by the base station, the base station sends a time domain position notification message to the terminal. For example, the time domain position notification message may be carried by a DCI, or a downlink reception beam training trigger message, or a dedicated special time domain position notification signaling, or other downlink signaling. The terminal acquires the time frequency positions of the downlink reception beam training signals in the subframe through the message or signaling.

According to the embodiments of the present disclosure, the downlink reception beam training request message is sent to the base station, the downlink reception beam training trigger notification message sent by the base station to the terminal is received, the downlink reception beam training signals sent by the base station is received based on the downlink reception beam training trigger notification message, so that the terminal performs the downlink beam training based on a base station-based trigger mechanism.

Third Embodiment

Figure 6:
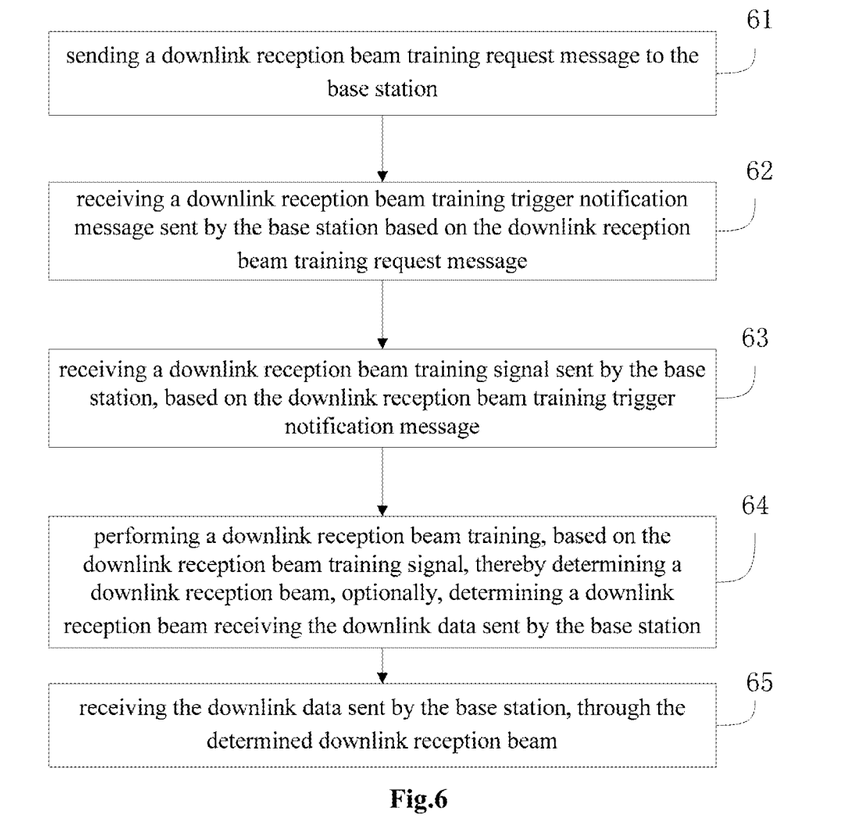
FIG. 6 is a flowchart of a method for training downlink beams at a terminal side in some embodiments of the present disclosure.

As shown in FIG. 6, a method for training downlink beams is provided in some embodiments of the present disclosure, including:

Step 61: sending a downlink reception beam training request message to the base station, where the terminal may also send to the base station a quantity of downlink reception beams of the terminal or a quantity of downlink reception beams that needed to be trained, and the base station determines, based on the quantity of the downlink reception beams or the quantity of downlink reception beams to be trained, the quantity of downlink reception beam training signals. Here, the terminal may send to the base station both the downlink reception beam training request message and the quantity of downlink reception beams of the terminal or the quantity of the downlink reception beams to be trained, or only the downlink reception beam training request message is sent to the base station, or only the quantity of downlink reception beams of the terminal or the quantity of downlink reception beams to be trained is sent to the base station.

Step 62: receiving a downlink reception beam training trigger notification message sent by the base station based on the downlink reception beam training request message.

Step 63: receiving downlink reception beam training signals sent by the base station, based on the downlink reception beam training trigger notification message.

Step 64: performing a downlink reception beam training, based on the downlink reception beam training signals, thereby determining a downlink reception beam, optionally, determining a downlink reception beam receiving the downlink data sent by the base station.

The step of performing the downlink reception beam training may further include: performing, by the second device, an AGC (Automatic Gain Control) adjustment by using the trained downlink reception beam.

Further, Step 64 may further include:

Step 65: receiving the downlink data sent by the base station, through the determined downlink reception beam.

Step 64 may further include: performing the downlink reception beam training based on the downlink reception beam training signals in the case that the beam receiving beam training trigger notification message applies, and determining the downlink reception beam.

The effective time point of the downlink reception beam training trigger notification message is a time point of receiving the downlink reception beam training trigger notification message plus a time interval. In other words, the effective time point of the downlink reception beam training trigger notification message is a time point of receiving the downlink reception beam training trigger notification message plus the time interval, where the time interval may be 0 or larger than 0.

The time interval may be appointed by the protocol, or appointed by the terminal and the base station in advance, or determined by the base station.

When the time interval is determined by the base station, the base station may send the time interval to the terminal through the time interval notification signaling; or the time interval may also be obtained from the downlink reception beam training trigger notification message. Of course, the time interval may also be carried by other downlink information blocks. The time interval notification signaling includes information about the time interval. The terminal obtains the time interval based on the information or signaling.

The terminal may obtain a start time of downlink reception beam training based on the time interval.

The terminal assumes that time point when the downlink reception beam training trigger notification message applies is at the time of receiving the downlink reception beam training trigger notification message plus the time interval, and the time interval is fixed or is notified by the base station (for example, carried in the downlink reception beam trigger notification message, or, it can be obtained from the time frequency positions of the downlink receiving training signal in the downlink reception beam trigger notification message. For example, the base station may also carry the time interval through the DCI, or a dedicated time domain position notification signaling, or other downlink signaling, etc.

For example, if the terminal receives the downlink reception beam trigger signaling in the $n^{th}$ subframe, the downlink reception beam training signals is in the $(n+m)^{th}$ subframe, where the value of m is fixed (for example, m=4), or the value of m is carried in the trigger notification message or other message carrying the notification signaling about the time interval or the downlink reception beam training sequence position, m=0, which means that the training signal and the trigger message are in the same subframe.

The subframe here may be a subframe in the LTE system, or may be a frame or other time units in the LTE system, or may be a time unit in other systems, which is not limited herein.

In addition, in Step 64, the downlink reception beam training is performed after the downlink reception beam training trigger notification message applies.

In the first case, the terminal receives the downlink reception beam training signals through different downlink reception beams, and selects the downlink reception beam with a strongest receiving signal power as the downlink reception beam that receives the downlink data sent by the base station.

In the second case, the terminal receives the downlink reception beam training signals through different downlink reception beams, performs a channel estimation, and selecting, based on a result of the channel estimation, the downlink reception beam with a strongest receiving signal power as the downlink reception beam that receives the downlink data sent by the base station.

When the downlink reception beam training is performed by the terminal, the quantity of the downlink reception beams received in one time point is not limited. For example, the terminal may receive a training sequence through only one receiving beam at one time point, or the terminal may receive simultaneously the training sequences through a plurality of receiving beams at one time point, which is not limited herein.

The terminal may perform the downlink reception beam training through a wide downlink reception beam, then perform the downlink reception beam training through a narrow downlink reception beam, and determine an optimal narrow downlink reception beam as the downlink reception beam that receives the downlink data sent by the base station. The narrow receiving beam may cover the coverage range of the wide receiving beam, or the coverage of the narrow receiving beam is slightly larger than the coverage of the wide receiving beam.

Optionally, the downlink reception beam training and the downlink transmission beam training are performed simultaneously.

Optionally, the downlink reception beam training and the downlink transmission beam training are performed alternately.

Figure 7:
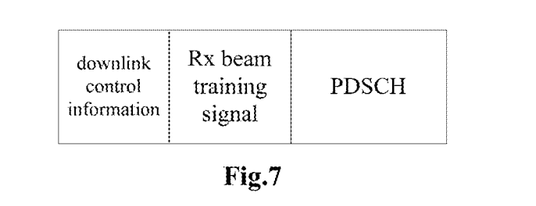
FIG. 7 is a schematic view of a typical downlink reception beam training trigger notification message and downlink reception beam training signal received by a terminal.

FIG. 7 is a schematic view of a typical downlink reception beam training trigger notification message and downlink reception beam training signal received by a terminal In FIG. 7, the trigger message of the downlink reception beam and the downlink reception beam training signals are in the same subframe. After receiving the downlink reception beam training signals, the base station may send downlink data to the terminal, and the terminal receives the downlink data sent by the base station. The subframe here may be a subframe in the LTE system, or may be a frame or other time units in the LTE system, or may be a time unit in other systems, which is not limited herein.

The downlink data and the downlink reception beam training signals may be transmitted through the same downlink transmission beam, so that the terminal may, after acquiring the best downlink reception beam by receiving the downlink reception beam training signals, receive the data through the best downlink reception beam.

Figure 8:
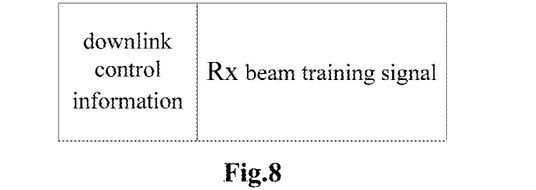
FIG. 8 is a schematic view of another typical downlink reception beam training trigger notification message and downlink reception beam training signal received by a terminal.

FIG. 8 is a schematic view of another typical downlink reception beam training trigger notification message and downlink reception beam training signal received by a terminal.

There is no data transmission (for the terminal) in the subframe, subsequent to the downlink control signaling, there is only the downlink transmission beam training signal. The subframe here may be a subframe in the LTE system, or may be a frame or other time units in the LTE system, or may be a time unit in other systems, which is not limited herein.

The terminal may, after acquiring the best downlink reception beam by receiving the downlink reception beam training signals, save the weight of the best downlink reception beam for the subsequent downlink data reception.

The method for training downlink beams in some embodiments of the present disclosure is applicable to analog and digital-analog hybrid beamforming, and is also applicable to digital beamforming, which may realize a trigger-based downlink reception beam training.

Fourth Embodiment

A device for training downlink beams is further provided in some embodiments of the present disclosure, including:

a receiving module, configured to receive a downlink reception beam training trigger notification message sent by a base station; and a training module, configured to receive downlink reception beam training signals sent by the base station, based on the downlink reception beam training trigger notification message, and perform a downlink reception beam training based on the downlink reception beam training signals.

The device for training downlink beams may further include: a first sending module, configured to send a downlink reception beam training request message to the base station.

The device for training downlink beams may further include: a second sending module, configured to send, to the base station, a quantity of downlink reception beams of a second device or a quantity of downlink reception beams needed to be trained of the second device.

The receiving module is further configured to: receive the downlink reception beam training trigger notification message sent by the base station to the terminal, through downlink control information DCI or a dedicated trigger signaling or other downlink information blocks.

The downlink reception beam training trigger notification message includes but not limited to: indication information of whether there exists the downlink reception beam training signals and/or time frequency positions of the downlink reception beam training signals.

The training module is further configured to: receive the downlink reception beam training signals sent by the base station through downlink transmission beams determined by the base station, based on the downlink reception beam training trigger notification message.

The device for training downlink beams may further include: a third sending module, configured to report, to the base station, result information about the training of the downlink transmission beams of the base station.

The result information includes but not limited to: recommended identifiers of the downlink transmission beams of the base station by the terminal and/or strength information of the downlink transmission beam training signals of the base station measured by the terminal.

The training module is further configured to: receive the downlink reception beam training signals sent by the base station, based on the downlink reception beam training trigger notification message and time domain positions of the downlink reception beam training signals in a subframe.

The subframe here may be a subframe in the LTE system, or may be a frame or other time units in the LTE system, or may be a time unit in other systems, which is not limited herein.

The time domain positions of the downlink reception beam training signals in the subframe are appointed by the terminal and the base station or determined by the base station.

The training module is further configured to: perform the downlink reception beam training based on the downlink reception beam training signals in the case that the beam receiving beam training trigger notification message applies, and determine a downlink reception beam.

An effective time point of the downlink reception beam training trigger notification message is a time point of receiving the downlink reception beam training trigger notification message plus a time interval, where the time interval is appointed by the terminal and the base station or determined by the base station.

The training module is further configured to: receiving the downlink reception beam training signals through different downlink reception beams, and select the downlink reception beam with a strongest receiving signal power as the downlink reception beam that receives the downlink data sent by the base station; or receive the downlink reception beam training signals through different downlink reception beams, performing a channel estimation, and select, based on a result of the channel estimation, the downlink reception beam with a strongest receiving signal power as the downlink reception beam that receives the downlink data sent by the base station; or perform the downlink reception beam training through a wide downlink reception beam, then perform the downlink reception beam training through a narrow downlink reception beam, and determine an optimal narrow downlink reception beam as the downlink reception beam that receives the downlink data sent by the base station The receiving module is further configured to receive the downlink data sent by the base station, through the determined downlink reception beam.

The downlink reception beams those receive the downlink data are the same with the reception beams those receive the downlink reception beam training signals.

It should be noted that, the device for training downlink beams is the device corresponding to the foregoing method, and all the embodiments in the foregoing methods are applicable to the embodiment of the device, and may achieve the same technical effects.

Fifth Embodiment

Figure 9:
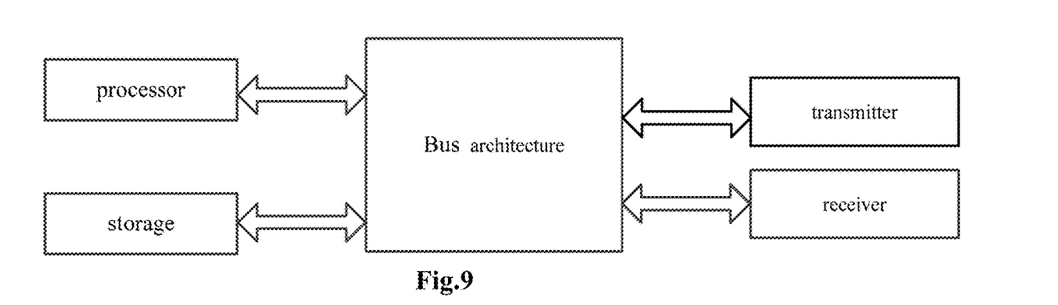
FIG. 9 is a schematic view of a terminal in the present disclosure.

As shown in FIG. 9, a terminal is further provided in some embodiments of the present disclosure, including:

a receiver, configured to receive a downlink reception beam training trigger notification message sent by a base station;

a processor, configured to implement the functions implemented by the following functional modules including:

a training module, configured to receive downlink reception beam training signals sent by the base station, based on the downlink reception beam training trigger notification message, and perform a downlink reception beam training.

The terminal may further include: a transmitter, configured to send a downlink reception beam training request message to the base station.

The transmitter is further configured to send, to the base station, a quantity of downlink reception beams of the terminal or a quantity of downlink reception beams that needed to be trained.

The receiver is further configured to: receive the downlink reception beam training trigger notification message sent by the base station to the terminal, through downlink control information DCI or a dedicated trigger signaling or other downlink information blocks.

The downlink reception beam training trigger notification message includes but not limited to: indication information of whether there exists the downlink reception beam training signals and/or time frequency positions of the downlink reception beam training signals.

The training module is further configured to: receive the downlink reception beam training signals sent by the base station through downlink transmission beams determined by the base station, based on the downlink reception beam training trigger notification message.

The transmitter is further configured to report, to the base station, result information about the training of the downlink transmission beams of the base station.

The result information includes but not limited to: recommended identifiers of the downlink transmission beams of the base station by the terminal and/or strength information of the downlink transmission beam training signals of the base station measured by the terminal.

The training module is further configured to: receive the downlink reception beam training signals sent by the base station, based on the downlink reception beam training trigger notification message and time domain positions of the downlink reception beam training signals in a subframe.

The subframe here may be a subframe in the LTE system, or may be a frame or other time units in the LTE system, or may be a time unit in other systems, which is not limited herein.

The time domain positions of the downlink reception beam training signals in the subframe are appointed by the terminal and the base station or determined by the base station.

The training module is further configured to: perform the downlink reception beam training based on the downlink reception beam training signals in the case that the beam receiving beam training trigger notification message applies, and determine a downlink reception beam.

An effective time point of the downlink reception beam training trigger notification message is a time point of receiving the downlink reception beam training trigger notification message plus a time interval, where the time interval is appointed by the terminal and the base station or determined by the base station.

The training module is further configured to: receiving the downlink reception beam training signals through different downlink reception beams, and select the downlink reception beam with a strongest receiving signal power as the downlink reception beam that receives the downlink data sent by the base station; or receive the downlink reception beam training signals through different downlink reception beams, performing a channel estimation, and select, based on a result of the channel estimation, the downlink reception beam with a strongest receiving signal power as the downlink reception beam that receives the downlink data sent by the base station; or perform the downlink reception beam training through a wide downlink reception beam, then perform the downlink reception beam training through a narrow downlink reception beam, and determine an optimal narrow downlink reception beam as the downlink reception beam that receives the downlink data sent by the base station The receiving module is further configured to receive the downlink data sent by the base station, through the determined downlink reception beam.

The downlink reception beams those receive the downlink data are the same with the reception beams those receive the downlink reception beam training signals.

In some embodiments of the present disclosure, the processor is coupled to the memory via a bus interface, and the processor is coupled via a bus interface receiver or transmitter; the storage is for storing programs and data used by the processor in performing operations;

A bus interface is an interface of any number of interconnected buses and bridges that may be included in bus architecture, specifically linked by one or more processors represented by the processor and various circuits of memory represented by the memory. The bus architecture can also link various other circuits such as peripherals, voltage regulators, and power management circuits, which are well known in the art and, therefore, will not be further described herein. The bus interface provides an interface. The receiver or transmitter can be a plurality of components that provide means for communicating with various other devices on a transmission medium.

This embodiment of the disclosure may also achieve a trigger-based downlink reception beam training.

Sixth Embodiment

Figure 10:
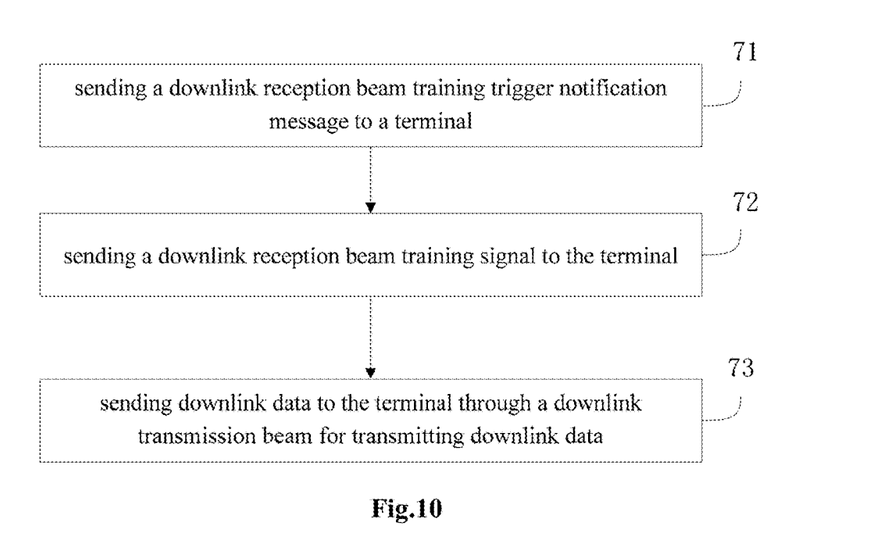
FIG. 10 is a flowchart of a method for training downlink beams at a base station side in the present disclosure.

As shown in FIG. 10, a method for training downlink beams is further provided in some embodiments of the present disclosure, including:

Step 71: sending a downlink reception beam training trigger notification message to a terminal.

Furthermore, before Step 71, the method may further include: receiving a downlink reception beam training request message sent by the terminal. Further, the base station may perform a downlink reception beam training for the terminal based on the downlink reception beam training request message sent by the terminal.

Before the above step, the method may further include: receiving a quantity of downlink reception beams sent by the terminal or a quantity of downlink reception beams needed to be trained sent by the terminal, so that the quantity of downlink reception beam training signals may be determined based on the quantity of downlink reception beams that are sent by the terminal or the quantity of downlink reception beams that needed to be trained sent by the terminal.

Specifically, the downlink reception beam training trigger notification message is sent to the terminal, through downlink control information DCI, or a dedicated signaling, or other downlink information blocks.

The downlink reception beam training trigger notification message includes but is not limited to: indication information of whether there is downlink reception beam training signals and/or a time frequency location of the downlink reception beam training signals.

Step 72: sending downlink reception beam training signals to the terminal.

Specifically, the base station determines a downlink transmission beam, shapes the downlink transmission beam training signal through the beamforming weights of the downlink transmission beams, and then sends the resultant signal to the terminal.

Before the above step, the method may further include: receiving, by the base station, result information about the training of the downlink transmission beams of the base station reported by the terminal. The result information includes but not limited to: recommended identifiers of the downlink transmission beams of the base station by the terminal or strength information of the downlink transmission beam training signals of the base station measured by the terminal. The base station may determine the downlink transmission beam based on the training result information.

The time domain positions of the downlink reception beam training signals sent to the terminal in the subframe may be appointed by the protocol, or appointed by the terminal and the base station, or determined by the base station.

The subframe here may be a subframe in the LTE system, or may be a frame or other time units in the LTE system, or may be a time unit in other systems, which is not limited herein.

The time domain positions of the downlink reception beam training signals in the subframe is appointed by the protocol, or when the time domain positions of the downlink reception beam training signals in the subframe are appointed by the terminal and the base station, the appointed time domain positions may include: the first M OFDM symbols of each subframe appointed with the terminal, where M is a positive integer.

When the time domain positions of the downlink reception beam training signals in the subframe are determined by the base station, the base station sends a time domain position notification message to the terminal. For example, the time domain position notification message may be carried by a DCI, or a downlink reception beam training trigger message, or a dedicated special time domain position notification signaling, or other downlink signaling. For example, the base station determines the first M OFDM symbols in the subframe of the downlink reception beam training signals, and the time domain position notification message sent by the base station to the terminal is the value of M.

The effective time point of the downlink reception beam training trigger notification message is a time point of receiving the downlink reception beam training trigger notification message plus a time interval, where the time interval is appointed by the terminal and the base station or determined by the base station.

When the time interval is determined by the base station, the base station sends the time interval notification message to the terminal. The time interval notification message may be carried by the DCI, or carried by the downlink reception beam training trigger notification message, or carried by other downlink information blocks. For example, if the terminal receives the downlink reception beam trigger signaling in the $n^{th}$ subframe, the downlink reception beam training signals is in the $(n+m)^{th}$ subframe, the value of m is fixed (for example, m=4), or the value of m is carried in the trigger notification message or other message carrying the notification signaling about the time interval or the downlink reception beam training sequence position.

In some embodiments of the present disclosure, based on the foregoing Steps 71 and 72, the method further includes:

Step 73: sending downlink data to the terminal through downlink transmission beams for transmitting downlink data.

The method for training downlink beams in some embodiments of the present disclosure is applicable to analog and digital-analog hybrid beamforming, and is also applicable to digital beamforming, which may realize a trigger-based downlink reception beam training.

Seventh Embodiment

A device for training downlink beams is further provided in some embodiments of the present disclosure, including:

a first sending module, configured to send a downlink reception beam training trigger notification message to a terminal; and a second sending module, configured to send downlink reception beam training signals to the terminal.

The device may further include: a first receiving module, configured to receive a downlink reception beam training request message sent by the terminal.

The device may further include: a second receiving module, configured to receive a quantity of downlink reception beams sent by the terminal or a quantity of downlink reception beams needed to be trained sent by the terminal.

The first sending module is further configured to send the downlink reception beam training trigger notification message to the terminal, through downlink control information DCI, or a dedicated signaling, or other downlink information blocks.

The downlink reception beam training trigger notification message includes, but is not limited to, indication information of whether there is the downlink reception beam training signals and/or a time frequency location of the downlink reception beam training signals.

The second sending module is further configured to: receive result information about a training of the downlink transmission beams of the base station reported by the terminal; determine, based on the result information, the downlink transmission beam used by sending the downlink reception beam training signals.

The second sending module is configured to: receive result information about a training of downlink transmission beams of the base station reported by the terminal, and determine, according to the result information, use, to send the downlink reception beam training signals, when determining the downlink transmission beam. Downstream transmission beam.

The result information includes but not limited to: recommended identifiers of the downlink transmission beams of the base station by the terminal or strength information of the downlink transmission beam training signals of the base station measured by the terminal.

The downlink transmission beams used by the downlink reception beam training signals are the same as the downlink transmission beams through which the base station sends downlink data to the terminal.

The time domain positions of the downlink reception beam training signals sent to the terminal in the subframe may be appointed by the protocol, or appointed by the terminal and the base station, or determined by the base station.

The subframe here may be a subframe in the LTE system, or may be a frame or other time units in the LTE system, or may be a time unit in other systems, which is not limited herein.

When the time domain positions of the downlink reception beam training signals in the subframe are determined by the base station, the base station sends a time domain position notification message to the terminal.

The effective time point of the downlink reception beam training trigger notification message is a time point of receiving the downlink reception beam training trigger notification message plus a time interval, where the time interval is appointed by the terminal and the base station or determined by the base station.

When the time interval is determined by the base station, the base station sends the time interval notification message to the terminal. The time interval notification message may be carried by the DCI, or carried by the downlink reception beam training trigger notification message, or carried by other downlink information blocks.

It should be noted that, the device for training downlink beams is the device corresponding to the foregoing method, and all the embodiments in the foregoing methods are applicable to the embodiment of the device, and may achieve the same technical effects.

Eighth Embodiment

A base station is further provided in some embodiments of the present disclosure, including:

a transmitter, configured to send the downlink reception beam training trigger notification message to a terminal and send the downlink reception beam training signals to the terminal.

The base station may further include: a receiver, configured to receive a downlink reception beam training request message sent by the terminal. The receiver is further configured to receive the quantity of downlink reception beams sent by the terminal or the quantity of downlink reception beams that needed to be trained.

The transmitter sends a downlink reception beam training trigger notification message to the terminal through the downlink control information DCI, or dedicated signaling, or other downlink information blocks.

The downlink reception beam training trigger notification message includes, but is not limited to, indication information of whether there is the downlink reception beam training signals and/or a time frequency location of the downlink reception beam training signals.

The transmitter is further configured to: determine a downlink transmission beam used by the downlink reception beam training signals, and shape the downlink reception beam training signals through the beamforming weights of the downlink transmission beams, and then send the resultant signal to the terminal.

The transmitter is further configured to: receive result information about a training of downlink transmission beams of the base station reported by the terminal, and determine, based on the result information, a downlink transmission beam that sends the downlink reception beam training signals.

The result information includes, but is not limited to, recommended identifiers of the downlink transmission beams of the base station by a terminal and/or strength information of the downlink transmission beam training signals of the base station measured by a terminal.

The downlink transmission beams used by the downlink reception beam training signals are the same with the downlink transmission beams through which the base station sends downlink data to the terminal.

The time domain positions of the downlink reception beam training signals sent to the terminal in the subframe are defined by the protocol, or is agreed between the terminal and the base station, or determined by the base station.

The subframe here may be a subframe in the LTE system, or may be a frame or other time units in the LTE system, or may be a time unit in other systems, which is not limited herein.

When the time domain positions of the downlink reception beam training signals in the subframe are determined by the base station, the base station sends a time domain position notification message to the terminal.

The effective time point of the downlink reception beam training trigger notification message is a time point of receiving the downlink reception beam training trigger notification message plus a time interval, where the time interval is appointed by the terminal and the base station or determined by the base station.

When the time interval is determined by the base station, the base station sends the time interval notification message to the terminal. The time interval notification message may be carried by the DCI, or carried by the downlink reception beam training trigger notification message, or carried by other downlink information blocks.

In some embodiments of the present disclosure, the device may further include: a processor, a memory connected to the processor through a bus interface, where the transmitter and the receiver are both connected to the processor through the bus interface, and the storage is configured to store the program and data that the processor uses when performing operations.

A bus interface is an interface of any number of interconnected buses and bridges included in a bus architecture, specifically linked by one or more processors represented by the processor and various circuits of memory represented by the memory. The bus architecture may also link various other circuits such as peripherals, voltage regulators, and power management circuits, which are well known in the art and, therefore, will not be further described herein. The bus interface provides an interface. The receiver or transmitter may be a plurality of components that provide means for communicating with various other devices on a transmission medium.

This embodiment of the disclosure may also achieve a trigger-based downlink reception beam training.

The above are merely some embodiments of the present disclosure. A person skilled in the art may make further modifications and improvements without departing from the principle of the present disclosure, and these modifications and improvements shall also fall within the scope of the present disclosure.

What is claimed is:

1. A method for training downlink beams, comprising:
    receiving a downlink reception beam training trigger notification message sent by a first device;
    receiving downlink reception beam training signals sent by the first device, based on the downlink reception beam training trigger notification message and time domain positions of the downlink reception beam training signals in a subframe; and
    performing a downlink reception beam training based on the downlink reception beam training signals;
    wherein the downlink reception beam training trigger notification message comprises: indication information of whether there exist the downlink reception beam training signals;
    wherein the performing the downlink reception beam training based on the downlink reception beam training signals comprises:
    performing the downlink reception beam training based on the downlink reception beam training signals in the case that the beam receiving beam training trigger notification message applies;
    wherein an effective time point of the downlink reception beam training trigger notification message is a time point of receiving the downlink reception beam training trigger notification message plus a time interval, wherein the time interval is appointed by a second device and the first device or determined by the first device;
    wherein the receiving the downlink reception beam training signals sent by the first device based on the downlink reception beam training trigger notification message comprises:
    receiving the downlink reception beam training signals sent by the first device through downlink transmission beams determined by the first device, based on the downlink reception beam training trigger notification message;
    prior to the receiving the downlink reception beam training signals sent by the first device through downlink transmission beams determined by the first device based on the downlink reception beam training trigger notification message, the method further comprises:
    reporting, to the first device, result information about a training of the downlink transmission beams of the first device.

2. The method according to claim 1, wherein prior to the receiving the downlink reception beam training trigger notification message sent by the first device, the method further comprises: sending a downlink reception beam training request message to the first device; and/or
    prior to the receiving the downlink reception beam training signals sent by the first device based on the downlink reception beam training trigger notification message, the method further comprises: sending, to the first device, a quantity of downlink reception beams of a second device or a quantity of downlink reception beams needed to be trained of the second device.

3. The method according to claim 1, wherein the receiving the downlink reception beam training trigger notification message sent by the first device to a second device comprises: receiving the downlink reception beam training trigger notification message sent by the first device, through downlink control information DCI or a dedicated trigger signaling.

4. The method according to claim 1, wherein
    the receiving the downlink reception beam training signals sent by the first device, based on the downlink reception beam training trigger notification message comprises: receiving the downlink reception beam training signals sent by the first device, based on the downlink reception beam training trigger notification message and time domain positions of the downlink reception beam training signals in a subframe.

5. A device for training downlink beams, comprising a transceiver, a processor and a memory, wherein
    the transceiver is configured to receive a downlink reception beam training trigger notification message sent by a first device;
    the processor is configured to execute a program stored in the memory to: trigger the transceiver to receive downlink reception beam training signals sent by the first device, based on the downlink reception beam training trigger notification message and time domain positions of the downlink reception beam training signals in a subframe, and perform a downlink reception beam training based on the downlink reception beam training signals received by the transceiver;
    wherein the downlink reception beam training trigger notification message comprises: indication information of whether there exist the downlink reception beam training signals;
    wherein the processor is configured to execute a program stored in the memory to:
    perform the downlink reception beam training based on the downlink reception beam training signals in the case that the beam receiving beam training trigger notification message applies;
    wherein an effective time point of the downlink reception beam training trigger notification message is a time point of receiving the downlink reception beam training trigger notification message plus a time interval, wherein the time interval is appointed by a second device and the first device or determined by the first device;
    wherein the processor is configured to execute the program stored in the memory to: trigger the transceiver to receive the downlink reception beam training signals sent by the first device through downlink transmission beams determined by the first device, based on the downlink reception beam training trigger notification message;

prior to the receiving the downlink reception beam training signals sent by the first device through downlink transmission beams determined by the first device based on the downlink reception beam training trigger notification message, the processor is configured to execute the program stored in the memory to: trigger the transceiver to report, to the first device, result information about a training of the downlink transmission beams of the first device.

6. The device according to claim 5, wherein the transceiver is further configured to send a downlink reception beam training request message to the first device; and/or send, to the first device, a quantity of downlink reception beams of a second device or a quantity of downlink reception beams needed to be trained of the second device.

7. A method for training downlink beams, comprising:

sending a downlink reception beam training trigger notification message to a second device;

sending downlink reception beam training signals and time domain positions of the downlink reception beam training signals in a subframe to the second device, wherein the downlink reception beam training trigger notification message is configured to trigger the second device to receive the downlink reception beam training signals to perform a downlink reception beam training;

wherein the downlink reception beam training trigger notification message comprises: indication information of whether there exist the downlink reception beam training signals;

wherein a time point of sending the downlink reception beam training signals to the second device is a time point of sending the downlink reception beam training trigger notification message plus a time interval, wherein the time interval is appointed by a second device and the first device or determined by the first device;

wherein the sending the downlink reception beam training signals to the second device comprises:

determining a downlink transmission beam used by the downlink reception beam training signals;

beamforming the downlink reception beam training signals with a beamforming weight of the downlink transmission beam, and sending the beamformed downlink reception beam training signals to the second device;

wherein the determining the downlink transmission beam used by the downlink reception beam training signals comprises:

receiving result information about a training of the downlink transmission beam of the first device reported by the second device;

determining, based on the result information, the downlink transmission beam used to send the downlink reception beam training signals.

8. The method according to claim 7, wherein prior to the sending the downlink reception beam training trigger notification message to the second device, the method further comprises: receiving a downlink reception beam training request message sent by the second device; and/or prior to the sending the downlink reception beam training signals to the second device, the method further comprises: receiving a quantity of downlink reception beams sent by the second device or a quantity of downlink reception beams needed to be trained sent by the second device.

9. The method according to claim 7, wherein the sending the downlink reception beam training trigger notification message to the second device comprises: sending the downlink reception beam training trigger notification message to the second device, through downlink control information DCI or a dedicated signaling.

10. The method according to claim 7, wherein in the case that the time interval is determined by the first device, the first device sends a notification message of the time interval to the second device.

11. A device for training downlink beams, comprising: a transceiver, a processor and a memory, wherein the processor is configured to read a program stored in the memory to perform the steps of the method for training downlink beams according to claim 7.

12. The device according to claim 11, wherein the transceiver is further configured to receive a downlink reception beam training request message sent by the second device; and/or the transceiver is further configured to receive a quantity of downlink reception beams sent by the second device or a quantity of downlink reception beams needed to be trained sent by the second device.

* * * * *